E. N. WHITE.
ATTACHMENT FOR CAMERAS.
APPLICATION FILED JUNE 24, 1909.
1,006,161.
Patented Oct. 17, 1911.
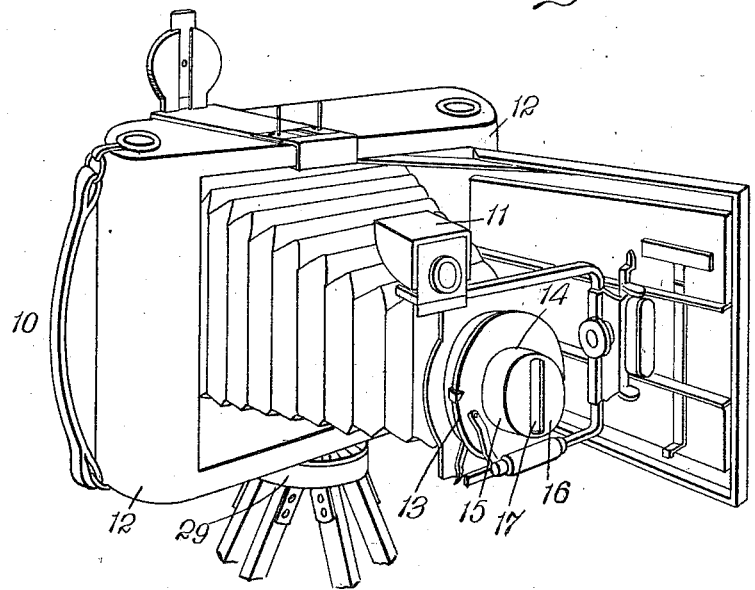
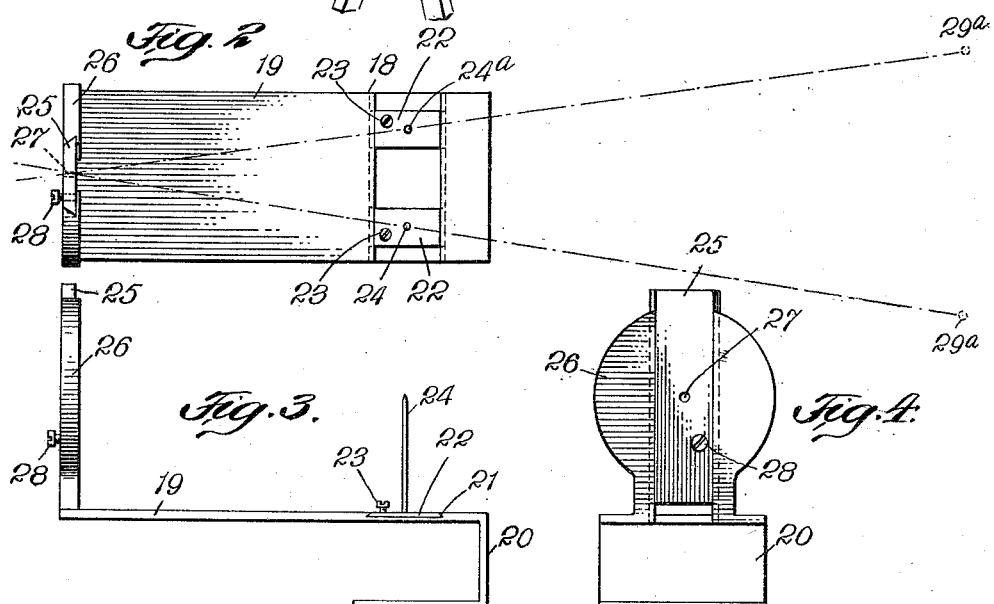
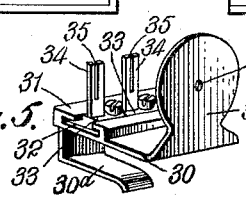

UNITED STATES PATENT OFFICE.

EDWARD NELSON WHITE, OF BANES, CUBA, ASSIGNOR OF TWO-FIFTHS TO JACOB F. OBERLE, OF NEW YORK, N. Y.

ATTACHMENT FOR CAMERAS.

1,006,161.      Specification of Letters Patent.      Patented Oct. 17, 1911.

Application filed June 24, 1909. Serial No. 504,195.

*To all whom it may concern:*

Be it known that I, EDWARD N. WHITE, a citizen of the United States, residing at Banes, Oriente, Republic of Cuba, have invented certain new and useful Improvements in Attachments for Cameras, of which the following is a full, clear, and exact description.

This invention relates more particularly to an attachment employed as a view finder for cameras to be used when taking panoramic pictures.

In my pending application, Serial No. 427,355, filed April 16, 1908, I disclosed an invention which had for its purpose the taking of panoramic pictures by the exposure of a sensitized body, as the usual film, and which body was moved a certain distance after each exposure so that the pictures were taken in succession, and the successive pictures made to overlap, and by special means caused the overlapped portion of one picture to blend into the next adjacent one and thereby produce a continuous panoramic view of any desired extent. In this application I provide a device to make the overlapped portions of the pictures blend into each other, and in connection with the device or blender, I employ a dial so indexed or divided that it could be definitely ascertained to what extent the camera was to be moved after each exposure in order that the successive pictures might be properly combined as a continuous whole.

While the dial above referred to answers the purpose very well, I find that it is desirable to provide an attachment in the way of a panoramic view finder to be employed in connection with the blender in which the extent or angle of view may be readily ascertained by visual means, and it is intended that the said visual means may be employed independently of or in connection with the dial, but in each case is intended to be used in connection with the blender when taking panoramic pictures.

The primary object of the present invention is to provide a simple and efficient device which may be attached to various forms of cameras without altering the construction thereof, and which device may be so positioned that the camera may be moved successively a certain distance and the exact distance of movement of the camera for each exposure of the picture or part of a picture readily ascertained.

Another object of the invention is to provide a device which may be employed as a panoramic view finder, which is so constructed that the said device may be employed in connection with various sizes of cameras, and in which the extent of view may be varied according to the size of camera in connection with which the invention is used.

A further object of the invention is to provide a simple and efficient device which may be used for ascertaining the extent of view of an ordinary camera independent of the use of a blender, wherein each view is to be entirely independent and distinct from the next succeeding one.

With these and other objects in view, the invention will be hereinafter more particularly described with reference to the accompanying drawings, which form a part of this specification, and will then be pointed out in the claims at the end of the description.

In the drawings, Figure 1 is a perspective view of a camera showing one form of the invention applied thereto. Fig. 2 is a detail plan view of the attachment or device showing how the device is employed to ascertain the angle of view of each picture. Fig. 3 is a detail side elevation. Fig. 4 is a front view; and Fig. 5 shows a slightly different form of device.

The camera 10 is of the ordinary folding type known as the "kodak" and may have the usual finder 11, or this finder may be dispensed with if desired, and said camera may be provided with the usual folding casing 12, and a movable lens holder 13, all of which may be of the usual or of any preferred construction.

On the lens holder and in front of the same is a device or blender 14. This blender may be of any desired form, and of any suitable material. As shown it is substantially the same as disclosed in my pending application hereinbefore referred to, and is cap-like in form and has its cylindrical body 15 provided with a disk-like face 16 in which is arranged a slot 17. This slot 17 extends vertically when the blender is in use, and by reason of the slot the said blender or device cuts off gradually the view at one end of each exposure or causes the main part of the exposure to exceed that at the ends, and this excess may be one-half at the ends what it is for the remainder of the exposure and is due to the use of the blender. As stated in my pending application, if the blender is not used a sharp line is produced between each exposure which would be impossible to blend properly, but with the use of the blender the exposure gradually diminishes at each end until it runs into nothing so that when the successive pictures are taken the lack of exposure to one picture at the overlapped portion will compensate for the lack of exposure of the overlapped part of the next succeeding picture.

If a succession of pictures are to be taken to produce what is termed a panoramic picture or a succession of pictures in which no line of distinction occurs between the different views, it is desirable that the camera be arranged so that the same may be moved a fixed distance according to the size of the picture to be taken. To effect this, I provide a device or attachment 18 which may be attached to the casing 12 of the camera or in any other desired location, and said device is so positioned with respect to the pivoting point of the camera that when said camera is swung on its pivot it will move the device so that the angle of view of the successive pictures may be readily ascertained. The device has a body or portion 19 which may be substantially rectangular, and at one end, as 20, may be angularly formed to provide a clip which is adapted to pass over a part of the casing to hold the same detachably thereto. This body may be provided with a transversely-extending groove 21, and said groove may be dovetailed, and movable in the groove are a plurality of slides 22 which may be adjustably held in the groove by means of slotted or knurled screws 23 to adapt the slides 22 to be adjusted toward or from each other on opposite sides of the longitudinal center of said device. Sights 24 and 24ª project upward from slides 22 and said sights are in the form of proper rods, and in line with the longitudinal center of the body 19 of the device is a slide or member 25. This member 25 has beveled edges adapted to fit in a dovetailed groove in the upwardly-extending portion 26 which is arranged at an angle with respect to the body 19 of the device. The part 26 may be enlarged somewhat, and in the slide or member 25 is a peep opening 27 through which the objects to be photographed may be readily seen, and carried by the member 25 is a screw or locking device 28 to permit the member 25 to be held in an adjusted position, so that the camera may be made to take photographs or objects located close to the camera, and on the ground or elevated as desired.

The camera may be held to swing or rotate on a tripod 29 in the usual position or in any desired way, and the device is so positioned that the sights or posts 24 may be moved therewith. As shown in Fig. 2, when the device is in use and it is desired to take a succession of pictures for panoramic purposes, the blender 14 is properly placed in position, and the sights 24 and 24ª are adjusted to take in the proper angle of view. In starting the operator will fix upon some object in line with the peep hole or opening 27 and the sight 24ª, as for example a tree or other object, which may be indicated by the circle 29ª. An exposure is then made and the object or point fixed over the sight 24ª is kept in mind and the film is then moved the proper distance in the usual manner having been previously marked to determine the extent of movement thereof. After the film has been moved and the exposure has been made, the camera is then moved until the sight 24 occupies the point previously held by the sight 24ª, and until the line between the same and the peep hole 27 will again be in line with the object 29ª. A second exposure is then made at the same time a new object is taken into consideration over the sight 24ª, and the camera, after the film has been moved the proper distance is again positioned to have the sight 24 placed in line with the new object, thus the extent or angle of view may be quickly and accurately ascertained through the peep hole, so that a succession of views may be taken, said device being used independently of or in connection with the dial such as disclosed in the application previously mentioned.

In Fig. 5 the body 30 is provided with a spring clip 30ª and a raised part 31 in which is the transversely-extending groove 32. In the groove 31 are slides 33 and projecting upward therefrom are the posts or uprights 34. The posts 34 are provided with slots 35 which serve as the sighting means instead of the posts as in the other figures, the posts 34 being somewhat larger than the posts 24. A peep hole 36 is provided in the member 37, and this member may be fixed when the slots are used, though the peep hole may be arranged to be adjustable if desired.

From the foregoing, it will be seen that a simple and efficient device or attachment is provided which may be readily applied to various forms and makes of cameras and in such a way that the extent of view may be quickly ascertained; that said device may be adjusted to various sizes of cameras to take views of different extents; that said device may be so adjusted that the view may be taken either immediately in front of the camera or in an elevated position; and that said device or attachment may be employed in connection with a blender, or independently thereof, so that several pictures may be taken, or a succession of pictures properly united and blended so as to form a continuous panoramic view.

Having thus described my invention, I claim as new and desire to secure by Letters Patent:—

1. A view finder comprising a body, a sighting member at one end of the body, a pair of sighting members mounted at the other end of the body one on each side of the longitudinal axis, and means for attaching the body to a camera.

2. A view finder comprising a body, a sighting member at one end of the body, a pair of sighting members mounted at the other end of the body one on each side of the longitudinal axis and adjustable to and from such axis, and means for attaching the body to a camera.

3. A view finder comprising a body, a vertically adjustable sight member at one end of the body, the other end of the body being provided with a guide-way extending transversely to the longitudinal axis of the body, slides movable in said guide-way one on each side of said longitudinal axis, and a sighting member mounted on each slide.

4. A view finder comprising a body, a vertically adjustable sight member at one end of the body having a sight opening, the other end of the body being provided with a guide-way extending transversely to the longitudinal axis of the body, slides movable in said guide-way one on each side of said longitudinal axis, and a sighting member mounted on each said slide.

This specification signed and witnessed this 6th day of May A. D. 1909.

EDWARD NELSON WHITE.

Witnesses:
HAROLD HARTY,
CHAS. H. BUTCHER.

---

Copies of this patent may be obtained for five cents each, by addressing the "Commissioner of Patents, Washington, D. C."